United States Patent
Torttila et al.

(10) Patent No.: US 11,379,778 B2
(45) Date of Patent: Jul. 5, 2022

(54) CONSTRUCTION SITE PRODUCTIVITY CAPTURE USING COMPUTER VISION

(71) Applicant: Trimble Inc., Sunnyvale, CA (US)

(72) Inventors: Karoliina Torttila, Denver, CO (US); James Coleman, Longmont, CO (US); Robert Banfield, Riverview, FL (US); Matthew Compton, Louisville, CO (US)

(73) Assignee: Trimble Inc., Sunnyvale, CA (US)

( * ) Notice: Subject to any disclaimer, the term of this patent is extended or adjusted under 35 U.S.C. 154(b) by 48 days.

(21) Appl. No.: 16/813,609

(22) Filed: Mar. 9, 2020

(65) Prior Publication Data

US 2021/0279659 A1    Sep. 9, 2021

(51) Int. Cl.
G06Q 10/06 (2012.01)
G06T 7/73 (2017.01)
G06T 7/13 (2017.01)
G06Q 50/16 (2012.01)

(52) U.S. Cl.
CPC ....... *G06Q 10/0639* (2013.01); *G06Q 50/165* (2013.01); *G06T 7/13* (2017.01); *G06T 7/74* (2017.01); *G06T 2207/30164* (2013.01)

(58) Field of Classification Search
CPC ............. G06T 7/20; G06T 2207/10032; G06T 2207/30192; G06K 9/66; G06K 9/0063; G06K 9/46; G06K 2009/00738; G01W 1/00; G01W 2203/00
See application file for complete search history.

(56) References Cited

U.S. PATENT DOCUMENTS

| 2018/0165502 A1 | 6/2018 | Mianzo et al. |
| 2018/0239948 A1* | 8/2018 | Rutschman ............... G06T 7/20 |
| 2020/0327378 A1* | 10/2020 | Smith .................... G06N 5/048 |

FOREIGN PATENT DOCUMENTS

WO    2018/145158 A1    8/2018

OTHER PUBLICATIONS

Extended European Search Report for Application No. 21158653.2-1207, dated Jul. 14, 2021, 7 pages.

* cited by examiner

*Primary Examiner* — Joshua L Schwartz
(74) *Attorney, Agent, or Firm* — Kilpatrick Townsend & Stockton LLP (57) ABSTRACT

Embodiments describe a method for capturing objects in action at an earthmoving site. The method includes capturing an image of a region of the earthmoving site including an object, the image being recorded as captured digital data; identifying a classification of the object using a trained algorithm existing in memory of the image capturing device; sending the classification of the object to a remote server through a network; determining a pixel location and a boundary of the object within a field of view of the image capturing device based on positions of pixels of the object in the image; sending a set of images including the image to the remote server; determining an activity being performed by the object based on an analysis of digital data associated with the classification of the object and the movement of the object at the earthmoving site; and outputting a report to a user.

20 Claims, 7 Drawing Sheets

CONSTRUCTION SITE PRODUCTIVITY CAPTURE USING COMPUTER VISION

BACKGROUND

Heavy equipment, such as excavators, dump trucks, loaders, bulldozers, mixers, and the like typically operate at earthmoving sites. Some examples of earthmoving sites include, but are not limited to, building/bridge/road construction sites, quarries, and mines. In many cases, the heavy equipment are provided by many different contractors and subcontractors, and are often equipped with provider-specific monitoring devices to track the activity and productivity of each heavy equipment during the construction process. Thus, it may be difficult for a single entity, e.g., a construction manager or owner, to track the productivity of all of the heavy equipment through the construction process.

SUMMARY

Embodiments provide image capturing methods and systems for capturing productivity at an earthmoving site using computer vision to track productivity of heavy equipment without provider-specific monitoring devices. Image capturing devices can be positioned at an earthmoving site to capture images of heavy equipment and surface contours of the earthmoving site. The system can analyze the captured images to identify the heavy equipment's type, movement, and position at the earthmoving site. The system can also analyze surface contours of the earthmoving site and selectively send images of the earthmoving site to a server for further image processing. Such methods and systems improve the simplicity, versatility, and efficiency at which productivity is captured at an earthmoving site.

In some embodiments, a method for capturing objects in action at an earthmoving site includes: capturing, by an image capturing device positioned at the earthmoving site, an image of a region of the earthmoving site including an object, the image being recorded as captured digital data; identifying a classification of the object using a trained algorithm existing in memory of the image capturing device; sending, by the image capturing device, the classification of the object to a remote server through a network; determining a pixel location and a boundary of the object within a field of view of the image capturing device based on positions of pixels of the object in the image; sending, by the image capturing device, a set of images including the image to the remote server, the set of images representing movement of the object at the earthmoving site; determining an activity being performed by the object based on an analysis of digital data associated with the classification of the object and the movement of the object at the earthmoving site; and outputting a report to a user based on the activity performed by the object at the earthmoving site.

The object can be a first object, the pixel location can be a first pixel location, the boundary can be a first boundary, and the image can include the first object and a second object. The method can further include determining a second pixel location and a second boundary of the second object within the field of view of the image capturing device based on positions of pixels of the second object in the image; determining a first three-dimensional (3D) position of the first object in the earthmoving site based on the first pixel location in the field of view of the first image capturing device and a third pixel location in a field of view of a second image capturing device; determining a second 3D position of the second object in the earthmoving site based on the second pixel location in the field of view of the first image capturing device and a fourth pixel location in the field of view of the second image capturing device; determining a distance between the first 3D location and the 3D location; comparing the distance to a proximity threshold indicating a minimum distance between the first and second objects; and in response to a determination that the distance is below the proximity threshold, performing the sending of the portion of the image to the remote server. The portion of the image can include the first object and the second object when the distance between the first 3D location and the second 3D location are below the proximity threshold. The method can further include generating, by the image capturing device, a warning signal in response to the determination that the distance is below the proximity threshold. The method can further include determining that the classification of the object is one of a set of predefined objects; and in response to the determination that the object is one of a set of predefined objects, performing the sending of the portion of the image to the remote server. The image capturing device can be a first image capturing device positioned at a first location within the earthmoving site, the image can be a first image, the region is a first region of the earthmoving site, the captured digital data can be a first captured digital data, and where the method further includes: capturing, by a second image capturing device positioned at a second location within the earthmoving site different from the first location, a second image of a second region of the earthmoving site including the object from a different perspective than the first image capturing device, the second image being recorded as second captured digital data; and using a first known position of the first image capturing device and second known position of the second image capturing device, along with a known 3D position of a common point captured within fields of view of the first and second image capturing devices, to determine a position of the object at the earthmoving site in 3D space. Determining the position and the boundary of the object can be performed by the image capturing device at the earthmoving site. The method can further include sending, by the image capturing device, the position and the boundary of the object into the remote server through the network. The boundary can be a boundary box that forms a rectangle around the object and that dynamically moves in location and dimension corresponding to a movement of the object through the set of images. The object can be at least one of a group consisting of heavy equipment and personnel.

In certain embodiments, an image capturing device for capturing objects in action at an earthmoving site includes: a camera for capturing images of a region of the earthmoving site; communication circuitry operable to send data to a remote server; memory for storing at least a portion of the captured images of the earthmoving site, the memory comprising an image classifier module or an object detection module; and a processor coupled to the memory, camera, and communication circuitry, the processor capable of executing instructions in the memory to: capture an image of a region of the earthmoving site including an object, the image being recorded as captured digital data; identify a classification of the object using a trained algorithm of the image classifier module or the object detection module existing in memory of the image capturing device; send the classification of the object to a remote server through a network; determine, by the object detection module, a pixel location and a boundary of the object within a field of view of the image capturing device based on positions of pixels of the object in the image; send a set of images including the image to the remote server, the set of images representing movement of the object at the earthmoving site; determine an activity being performed by the object based on an analysis of digital data associated with the classification of the object and the movement of the object at the earthmoving site; and output a report to a user based on the activity performed by the object at the earthmoving site.

The object can be a first object, the pixel location can be a first pixel location, the boundary is a first boundary, and the image can include the first object and a second object. The processor can be further configured to: determine a second pixel location and a second boundary of the second object within the field of view of the image capturing device based on positions of pixels of the second object in the image; determine a first three-dimensional (3D) position of the first object in the earthmoving site based on the first pixel location in the field of view of the first image capturing device and a third pixel location in a field of view of a second image capturing device; determine a second 3D position of the second object in the earthmoving site based on the second pixel location in the field of view of the first image capturing device and a fourth pixel location in the field of view of the second image capturing device; determine a distance between the first 3D location and the 3D location; compare the distance to a proximity threshold indicating a minimum distance between the first and second objects; and in response to a determination that the distance is below the proximity threshold, perform the sending of the portion of the image to the remote server. The set of images can include the first object and the second object when the distance between the first 3D location and the second 3D location are below the proximity threshold. The processor can be further configured to: generate a warning signal in response to the determination that the distance is below the proximity threshold.

In certain additional embodiments, a system for capturing an object in action at an earthmoving site includes: a first image capturing device positioned within the earthmoving site and operable to capture first images of a first region of the earthmoving site; and a second image capturing device positioned within the earthmoving site and configured to capture second images of a second region of the earthmoving site, wherein the first region overlaps with at least a portion of the second region, and wherein the first image capturing device and the second image capturing device are communicatively coupled to a remote server over a network, wherein the first image capturing device comprises: a camera for capturing the first images of the first region; communication circuitry operable to send data to the remote server; memory for storing at least a portion of the captured images of the earthmoving site, the memory comprising an image classifier module and an object detection module; and a processor coupled to the memory, camera, and communication circuitry, the processor capable of executing instructions in the memory to: capture an image of a region of the earthmoving site including an object, the image being recorded as captured digital data; identify a classification of the object using a trained algorithm existing in memory of the image capturing device; send the classification of the object to a remote server through a network; determine a pixel location and a boundary of the object within a field of view of the image capturing device based on positions of pixels of the object in the image; send a set of images including the image to the remote server, the set of images representing movement of the object at the earthmoving site; and determine an activity being performed by the object based on an analysis of digital data associated with the classification of the object and the movement of the object at the earthmoving site, wherein a report based on the activity performed by the object at the earthmoving site is outputted to a user.

The first image capturing device can be communicatively coupled to the second image capturing device so that data can be transferred between the first and second image capturing devices. The object can be a first object, the pixel location can be a first pixel location, the boundary can be a first boundary, and the image includes the first object and a second object. The processor can be further configured to: determine a second pixel location and a second boundary of the second object within the field of view of the image capturing device based on positions of pixels of the second object in the image; determine a first three-dimensional (3D) position of the first object in the earthmoving site based on the first pixel location in the field of view of the first image capturing device and a third pixel location in a field of view of a second image capturing device; determine a second 3D position of the second object in the earthmoving site based on the second pixel location in the field of view of the first image capturing device and a fourth pixel location in the field of view of the second image capturing device; determine a distance between the first 3D location and the 3D location; compare the distance to a proximity threshold indicating a minimum distance between the first and second objects; and in response to a determination that the distance is below the proximity threshold, perform the sending of the portion of the image to the remote server.

A better understanding of the nature and advantages of embodiments of the present invention may be gained with reference to the following detailed description and the accompanying drawings.

DETAILED DESCRIPTION

Heavy equipment are commonly implemented with provider-specific monitoring devices that are mounted on the heavy equipment to track their activity and productivity during operation. Software platforms by which the devices are used to monitor the heavy equipment are often specific to the system operated by that contractor or subcontractor. Thus, while a contractor may be able to monitor its own equipment, that contractor may be unable to monitor, or only able to monitor in a limited capacity, equipment owned and operated by other contractors and subcontractors. The inability to send and process data across different platforms makes it very difficult for a single entity, like the owner or supervisor of the construction project, to capture the productivity of all of the heavy equipment. Furthermore, the amount of text and image data that needs to be sent over the network can significantly increase construction cost as wireless service providers typically charge by amount of data transferred over the wireless network.

Embodiments describe an image capturing system that includes a network of image capturing devices positioned at various locations around an earthmoving site. Each image capturing device can monitor heavy equipment at the earthmoving site, and capture images of the heavy equipment within a field of view. The captured images can, in some instances, be captured periodically, such as every 2 to 5 minutes, as opposed to a video capture that captures tens of images every second. Each image capturing device can also process the captured images locally while selectively sending some captured images to a remote server, which can perform functions that require higher processing capabilities.

In some embodiments, each image capturing device can perform computer vision to identify the type of heavy equipment present in the field of view, while also defining a pixel location and boundary of each heavy equipment identified in the field of view, as will be discussed herein with respect to FIGS. 2 and 3. This data can also be used to identify a three-dimensional (3D) position of the heavy equipment using photogrammetry, as will be discussed further herein with respect to FIGS. 4 and 5. Each image capturing device can also identify what specific activities are being performed by the heavy equipment captured in the images, as well as selectively send captured images to a remote server for further processing, such as surface creation, as will be discussed further herein in Section II(D) and with respect to FIG. 8.

In some embodiments, some image capturing devices may not be able to perform one or more of those functions, in which case the one or more functions can be performed by a remote server that has the capability for such processing. In such embodiments, the image capturing devices can selectively send images to the remote server to minimize bandwidth usage, as will be discussed further herein with respect to Sections II(C) and II(D). This selective sending of captured images can result in efficient device and system operation by only sending and analyzing a subset of pertinent images instead of every captured image. Details of an image capturing system and its operations/capabilities are discussed in more detail herein.

I. Image Capturing System

Figure 1:
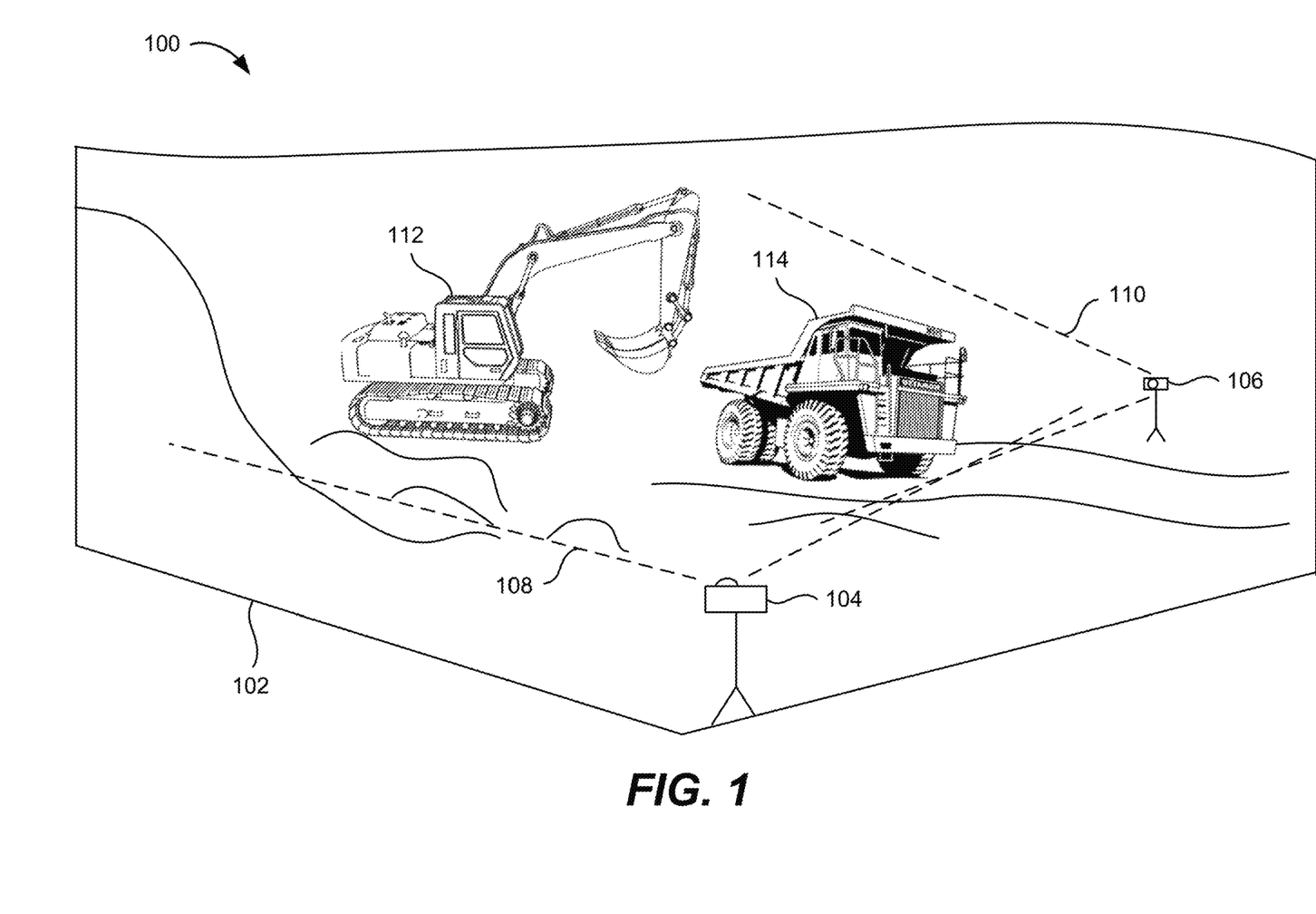
FIG. 1 is a simplified diagram of an example image capturing system implemented at an earthmoving site, according to some embodiments of the present disclosure.

FIG. 1 is a simplified diagram of an example image capturing system 100 implemented at an earthmoving site 102, according to some embodiments of the present disclosure. Image capturing system 100 can include a plurality of image capturing devices, e.g., cameras, such as first and second image capturing devices 104 and 106 for capturing images at earthmoving site 102. First image capturing device 104 can be positioned at a first location, and second image capturing device 106 can be positioned at a second location different from the first location. That way, first and second image capturing devices 104 and 106 can have different fields of view that capture different regions of the earthmoving site. Accordingly, both devices together can capture images of a larger region of earthmoving site 102 than either of them alone, thereby providing better coverage of earthmoving site 102 for capturing productivity.

In some embodiments, first image capturing device 104 can capture images of a first region 108 of earthmoving site 102, and second image capturing device 106 can capture images of a second region 110 of earthmoving site 102. At least a portion of first and second regions 108 and 110 of earthmoving site 102 can overlap with one another to form an overlapping region so that objects in the overlapping region can be captured by both image capturing devices from different perspectives. For example, as shown in FIG. 1, two objects, e.g., heavy equipment 112 and 114 are operating at the earthmoving site within the overlapping region of first and second regions 108 and 110. Thus, the field of view of each image capturing device 104 or 106 includes heavy equipment 112 and 114.

II. Computer Vision and Machine Learning

According to some embodiments of the present disclosure, various components of an image capturing system can perform computer vision and machine learning techniques on captured images to extract information from objects at the earthmoving site. For example, an image capturing device and/or a remote server can analyze pixel display patterns of captured images to identify and/or track certain features and characteristics of heavy equipment within the captured images. Using computer vision to identify and/or track the activity of heavy equipment allows the image capturing system to be contractor and subcontractor agnostic, meaning the system can monitor the productivity of any heavy equipment regardless of which contractor or subcontractor provided it to the construction project. This substantially simplifies the tracking process and improves the capabilities and versatility of the image capturing system. Furthermore, such image processing can enable useful functionality, such as image classification, object detection, three dimensional (3D) positioning, activity recognition, event recognition, surface creation, and safety awareness for gauging productivity and improving safety at an earthmoving site, as will be discussed further herein.

A. Image Classification

Image classification is a process that identifies an object in a captured image, and then creates a label for the captured image based on what type of object it is. In some embodiments, an algorithm trained by machine learning techniques can be applied to the captured image to identify the object. For instance, digital data representing a captured image of an excavator can be inputted into an image classification module, which can apply an algorithm to the digital data and output an excavator label for the captured image.

While image classification can identify one object, image classification can also identify more than one object in the captured image, and generate a label based on the more than one identified object. For example, digital data representing a captured image of an excavator and a dump truck can be inputted into an image classification module, which can apply an algorithm to the digital data and output an excavator label and a dump truck label for the captured image. If digital data representing a captured image including two excavators and a dump truck is inputted into an image classification module, the module can apply an algorithm to the digital data and output an excavator label and a dump truck label for the captured image.

Once the label is determined, corresponding information can be outputted to a user to indicate what types of heavy equipment are identified at the earthmoving site. FIG. 2 is an example output 200 by a user interface of an image capturing system performing image classification, according to some embodiments of the present disclosure. Output 200 can be a graphical output report having a primary section 202 that displays what is captured by an image capturing device. In the example shown in FIG. 2, the image that is captured and displayed in main section 202 is from the perspective of first image capturing device 104 in FIG. 1. As the system performs computer vision, the system can identify that the captured image includes two groupings of pixels 204 and 206 that are identified as respective meaningful objects 205 and 207. Machine learning can then be applied to those groupings of pixels to identify that grouping of pixels 204 is an excavator, e.g., heavy equipment 112 in FIG. 1, and grouping of pixels 206 is a dump truck, e.g., heavy equipment 114 in FIG. 1.

Output 200 can also include a secondary section 208 positioned adjacent to primary section 202. Secondary section 208 can be an arrangement of icons that show every type of heavy equipment that is being used at the earthmoving site, or only those types of heavy equipment that are selected to be monitored by a user to more efficiently display pertinent data to the user. As shown in FIG. 2, secondary section 208 can be a column of icons 210a-d positioned laterally adjacent to primary section 202. Icon 210a represents an excavator, icon 210b represents a bulldozer, icon 210c represents a dump truck, and icon 210d represents a loader.

Icons 210a-d can be configured to be in at least two states: a highlighted state and an un-highlighted state. Icons 210a-d can be highlighted according to which types of heavy equipment are identified at the earthmoving site. For instance, given that the system has identified that grouping of pixels 204 and 206 represent an excavator and a dump truck, icons 210a and 210c can be highlighted to inform the user that an excavator and a dump truck are present at the earthmoving site.

Figure 2:
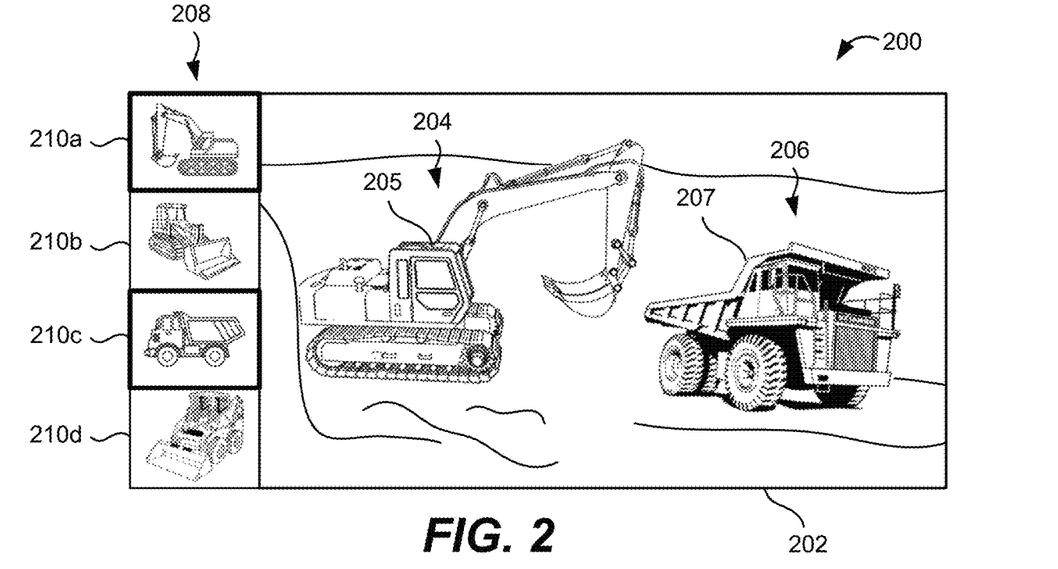
FIG. 2 is an example output by a user interface of an image capturing system performing image classification, according to some embodiments of the present disclosure.

Although FIG. 2 shows the highlighting as a border around an icon, embodiments are not so limited. Any suitable highlighting method that visually distinguishes an icon between a highlighted state and an un-highlighted state can be used, such as black-and-white versus color icons or an x-mark versus a check mark. Furthermore, although FIG. 2 only illustrates identifying two objects, embodiments are not limited to such configurations. Image capturing devices can identify more or less than two objects at the earthmoving site, such as one, three, or as many as can fit within the field of view of the image capturing device.

In some embodiments, image classification is performed at the edge, e.g., locally at the earthmoving site, by an image capturing device. Accordingly, the image capturing device can perform computer vision and machine learning techniques to its captured images in real time to identify objects within its field of view quicker and cheaper than it would be if image classification were performed by a remote server due to consequences associated with transmission of captured images to the remote server. By performing image classification at the edge, only the results from computer vision and machine learning can be sent to the remote server. Such transmission architectures can send data in lightweight data-interchange formats, such as JavaScript Object Notation (JSON) or Extensible Markup Language (XML), to minimize bandwidth and data transmission cost.

Although FIG. 2 shows an example output from a user interface, it is to be appreciated that image classification need not be performed in conjunction with outputting to a user interface. In other words, image classification can be performed to identify types of heavy equipment without having to display output 200 to a user. Output 200 is shown for ease of understanding during discussion of image classification. In some embodiments, the result of image classification can be the JSON data that is used for storage into a database and/or for further processing to enable additional functionality.

B. Object Detection

In addition to image classification, an image capturing system can perform object detection. Object detection is a process that analyzes the digital data representing the captured image to identify a type and pixel location of an object within a two-dimensional (2D) field of view of an image capturing device, and form a boundary around the object. Identifying the type of object in the captured image can be performed using an algorithm deciphered using machine learning, which is similar to how image classification is performed as discussed herein with respect to FIG. 2. The boundary can be a boundary box formed of boundary lines that extend in horizontal and vertical directions and that are tangential to the outermost surfaces of the object. Alternatively, the boundary can be a boundary line that conforms to the outer profile of the object; or, the boundary can be defined by an outer edge of a virtual shape that overlaps with the silhouette of the object. In some embodiments, the system can use computer vision to analyze the digital data representing the captured image to identify the outermost surfaces of the object for defining the boundary. It is to be appreciated that the term "pixel location" is intended to mean a 2D location of a pixel within an image captured within a field of view of an image capturing device, while "three-dimensional" or "3D" position is intended to mean x (lateral), y (depth), and z (height) position in the real, 3D world at the earthmoving site, from the perspective of an image capturing device.

Figure 3:
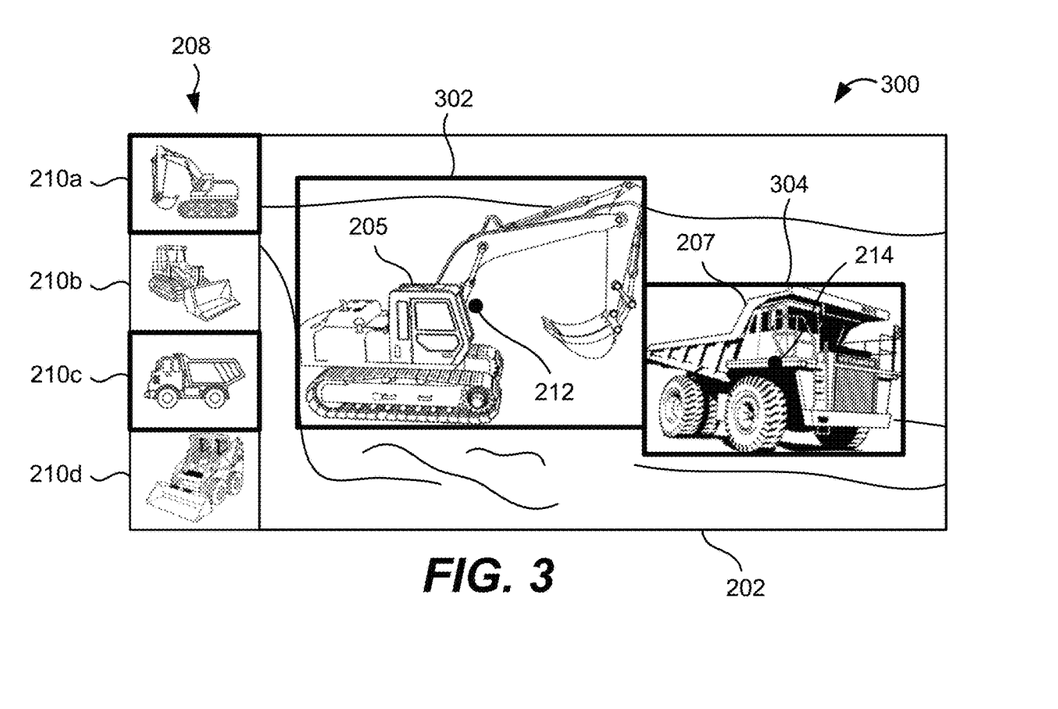
FIG. 3 is an example output by a user interface of an image capturing device performing object detection, according to some embodiments of the present disclosure

FIG. 3 is an example output 300 by a user interface of an image capturing device performing object detection, according to some embodiments of the present disclosure. Output 300 is similar to output 200 shown in FIG. 2, but with the addition of outputs from object detection. Thus, features of output 300 that reflect corresponding features in output 200 share the same reference number for ease of understanding and are not discussed here for brevity.

As shown in FIG. 3, boundaries 302 and 304 can be a digital boundary box positioned around respective objects 204 and 206, and be defined by horizontal and vertical boundary lines that are tangential to the farthest surfaces at the top, bottom, and opposing lateral sides of respective objects 204 and 206 within the field of view of the image capturing device. Each boundary line can be digital data defining a virtual line of pixels and their corresponding pixel coordinates within the field of view, where the field of view is represented as a 2D array of pixels displaying the captured image as shown in primary section 202. Using this information, positions 212 and 214 of respective objects 204 and 206 can be determined, such as by calculating respective centers of squares/rectangles formed by boundaries 302 and 304. Positions 212 and 214 can be pixel coordinate locations within the field of view of the image capturing device, as opposed to a position in 3D space within the earthmoving site, which can be determined by photogrammetry as will be discussed further herein. In instances where the boundary is formed of a boundary line that conforms to the outer surface of the object, or is defined by the outer profile of a virtual shape conforming to the silhouette of the object, the position can be determined using center-of-mass calculations in some embodiments.

Object detection can be performed locally by an image capturing device at the earthmoving site, or it can be performed remotely by a remote server once the captured images are sent to the remote server by the image capturing device. In instances where the image capturing device can perform object detection, a high performance graphical processor can be implemented to satisfy processing demand. If the image capturing device can perform image classification and not object detection, then a graphical processor having lower performance than the high performance processor can be implemented, thereby resulting in a lower cost image capturing device.

In some embodiments, boundaries 302 and 304 can be displayed in primary section 202 of output 300 by a user interface, as shown in FIG. 3. It is to be appreciated however that, like image classification, object detection need not be performed in conjunction with outputting to a user interface. That is, the positions and boundaries of the objects captured at the earthmoving site as a result of object detection can be outputted as JSON data that is used for storage into a database and/or for further processing to enable additional functionality, as will be discussed further herein with respect to photogrammetry and selective data transmission to a remote server.

C. Photogrammetry

Photogrammetry generally relates to obtaining information about physical objects and the environment through analysis of photographic images. One type of photogrammetry is stereophotogrammetry, which is a technique that estimates a 3D coordinate point in physical space based on an analysis of two offset 2D images captured from different perspectives. Known 3D positions of the image capturing devices that captured the offset 2D images at the earthmoving site can be used in conjunction with known 3D positions of certain common points perceived by the image capturing devices to calculate the 3D position of the object. The 3D positions of the image capturing devices and the common points can be inputted into the system during external calibration. Accordingly, image capturing systems that can perform photogrammetry include at least two image capturing devices, such as image capturing devices 104 and 106 in FIG. 1, that have overlapping regions of coverage of the earthmoving site.

Figure 4:
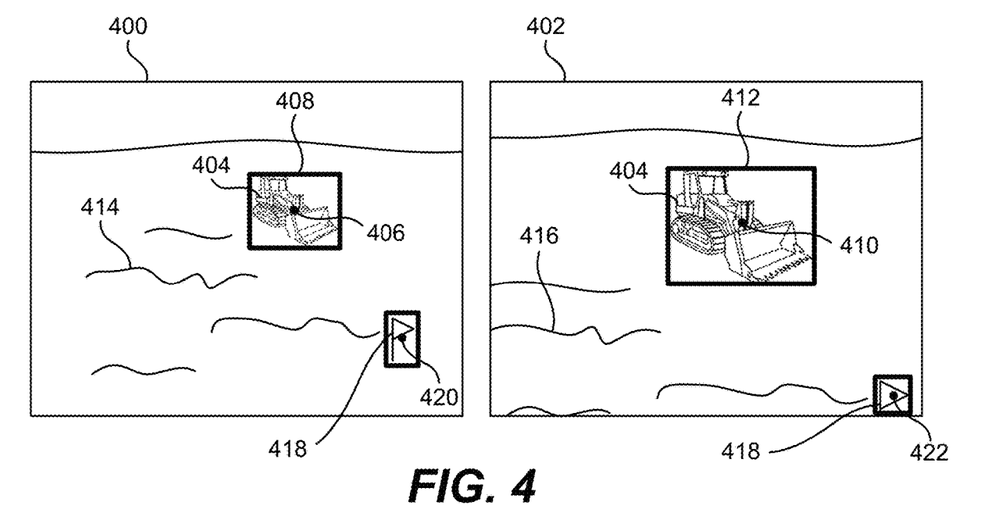
FIG. 4 is a simplified illustration of two offset images captured by respective first and second image capturing devices positioned at different locations at an earthmoving site, according to some embodiments of the present disclosure.

FIG. 4 is a simplified illustration of two offset images 400 and 402 captured by respective first and second image capturing devices positioned at different locations at an earthmoving site, according to some embodiments of the present disclosure. Each image 400 and 402 shows the field of view from the perspective of each image capturing device, both of which are taken at the same instance of time. Given the difference in perspectives, image 400 captured by the first image capturing device can show object 404 differently than image 402 captured by the second image capturing device.

In some embodiments, external calibration can be performed to calibrate the positioning functionalities of the image capturing system for accurate 3D position determination. External calibration can be performed by identifying common points at the earthmoving site, measuring the 3D position of the common points at the earthmoving site, determining the pixel location of the common points in the field of view for each image capturing device, and associating the 3D positions with the pixel locations in memory. A common point can be any feature of the earthmoving site that is captured within the field of view of more than one image capturing device.

For instance, a reference flag 418 can be a common point for both image capturing devices of FIG. 4 because reference flag 418 is shown in captured images 400 and 402 by first and second image capturing devices, respectively. Thus, during external calibration, the 3D position of reference flag 418 can be measured at the earthmoving site and stored in memory of the image capturing devices, and the pixel locations of reference flag 418 in the field of views of the respective first and second image capturing devices can be linked with the 3D position of reference flag 418. For instance, if reference flag 418 is at 3D position XYZ at the earthmoving site, pixel location 420 can be stored in the first image capturing device and associated with position XYZ, while pixel location 422 can be stored in the second image capturing device and associated with position XYZ. This information can act as a blueprint for assigning pixel location pairs (one pixel location from each image capturing device) with a 3D position of the earthmoving site. That way, the system can calculate 3D positions based on pixel locations of an object perceived by first and second image capturing devices. The pixel locations can be centers of boundaries that are determined during object detection, as discussed herein with respect to FIG. 3.

Instead of, or in addition to, reference flag 418, other common points can be identified and used as reference locations, such as unique surface contours, rocks, supply crates, landmarks, and any other unique feature at the earthmoving site. In some embodiments, a single reference flag can be moved to different locations at the earthmoving site, and the system can use the 3D position of the reference flag when it is positioned at those different locations for external calibration purposes.

Figure 5:
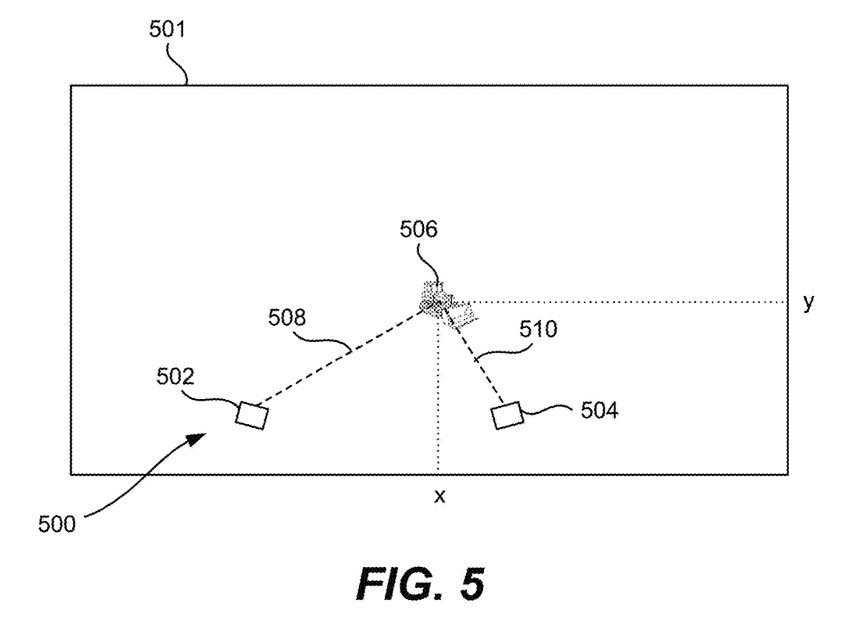
FIG. 5 is a simplified, top-down illustration of an image capturing system containing a first image capturing device and a second image capturing device implemented at an earthmoving site, according to some embodiments of the present disclosure

FIG. 5 is a simplified, top-down illustration of an image capturing system 500 containing a first image capturing device 502 and a second image capturing device 504 implemented at an earthmoving site 501, according to some embodiments of the present disclosure. First and second image capturing devices 502 and 504 can be positioned at different locations within earthmoving site 501 such that images of object 506 can be captured by both image capturing devices 502 and 504 at the same time but from different perspectives 508 and 510.

In some embodiments, analysis of the two offset images results in a 3D determination of where object 506 is positioned relative to the physical world at earthmoving site 501. For instance, the system can identify that object 506 is positioned at the x and y coordinates shown in FIG. 5 based on the analysis of the relative pixel locations of object 506 in the fields of view of the two offset images, as discussed herein with respect to FIG. 4. That way, system 500 can determine the 3D position of object 506 at the earthmoving site without needing to utilize any sensors, e.g., global position systems (GPS) and the like, installed on the heavy equipment that may be provider-specific and thus difficult to access as aforementioned herein.

As discussed herein, performing stereophotogrammetry requires knowing the pixel location of the object from two offset images captured by different image capturing devices at different perspectives. The information needed to perform photogrammetry may thus be sourced from two image capturing devices. Accordingly, in some embodiments, one image capturing device can be a primary image capturing device while the other image capturing device can be a secondary image capturing device. In such embodiments, each of the primary and secondary image capturing devices can perform object detection to identify the relative pixel locations of object 506 within their respective fields of view, as discussed herein with respect to FIG. 4. Then, the secondary image capturing device can send its perceived pixel location of object 506 to the primary image capturing device, which then uses the pair of pixels locations to identify the 3D position of object 506 at earthmoving site 501.

In some embodiments, photogrammetry is performed locally by the primary and secondary image capturing devices. In additional and alternative embodiments, photogrammetry is performed remotely by a remote server that receives the offset images from first and second image capturing devices 502 and 504. Performing photogrammetry locally allows decisions based on 3D positions of object 506, such as emitting an alarm by the device if object 506 moves out of a geo-fenced area of earthmoving site 501, to occur quicker and possibly cheaper than it would be if photogrammetry were performed by a remote server due to consequences associated with transmission of captured images to the remote server.

While photogrammetry can be used to identify a 3D position of object 506, embodiments are not limited to such functionality. In some embodiments, photogrammetry can be used for surface creation, which is an analysis of surface contours at the earthmoving site to track changes to the surface contours. Tracking changes to surface contours allows an image capturing system to track the productivity of certain activity at the earthmoving site, such as excavation, planarization, and the like. Analysis of the relative positions of surface features from each perspective, such as surface feature 414 captured by the first image capturing device and surface feature 416 captured by the second image capturing device shown in FIG. 4, along with the known optical baseline, allows the system to identify the 3D position of the surface feature and track how it moves. Surface creation can be performed by three or more image capturing devices. For example, some systems can have four image capturing devices that capture the same region of the earthmoving site for performing photogrammetry for surface creation purposes.

In some embodiments, surface creation may be performed by a remote server or a user terminal at a remote location that is accessing stored images in a database of the remote server.

In such embodiments, captured images from an image capturing device may need to be sent over a wireless network to a database that is accessible by the remote server. In some cases, it may be inefficient for the image capturing device to indiscriminately and continuously send captured images to the remote server, because the remote server would be performing surface creation even when the surface is not visible, e.g., blocked by heavy equipment, thereby wasting processing resources and resulting in a slower, more inefficient system. Furthermore, in instances where the wireless network charges a customer based on an amount of data sent through the network, it may be extremely costly for the image capturing device to indiscriminately and continuously send captured images to the remote server. Therefore, an image capturing device can be configured to selectively send certain images over the wireless network for surface creation purposes.

In some embodiments, captured images can be sent over the wireless network when the image capturing device determines an occurrence of a triggering event for surface creation, which will be referred to herein as a "surface creation triggering event". A surface creation triggering event can be a situation observed by an image capturing device where a vast majority of the captured image shows the surface of the earthmoving site. For instance, a surface creation triggering event can be an instance where no objects, e.g., heavy equipment, are present in the field of view, which occurs when the image capturing device has an unobstructed view of the surface of the earthmoving site. Once the surface creation triggering event is identified, then captured images may begin to be sent over the wireless network for surface creation purposes.

D. Activity Recognition and Event Recognition

In addition to photogrammetry, image capturing systems can also perform activity recognition and event recognition. Activity recognition is a process that analyzes the digital data representing movement of an object across a series of captured images to identify what specific activity is being performed by the object. For instance, the system can identify whether an excavator is scooping something up, rotating around its axis, or pouring something out, or it can identify whether a loader is raising its load or pouring out its load. Event recognition, on the other hand, is a process that analyzes a series of identified activities to identify an event, such as filling a dump truck. For instance, a system can perform event recognition to determine that a dump truck has been filled after the system has identified eight scooping, rotating, and pouring activities.

In some embodiments, an image capturing device can perform activity recognition and/or event recognition locally at the earthmoving site. In such embodiments, the processor can be a high performance processor capable of performing complex computations at a high rate of speed. In some other embodiments, activity recognition and/or event recognition may be performed by a remote server. In such embodiments, captured images from an image capturing device may need to be sent over a wireless network to a database that is accessible by the remote server so that the remote server can execute a discriminative algorithm to identify an activity of the object. In some cases, it may be inefficient for the image capturing device to indiscriminately and continuously perform activity/event recognition or send captured images to the remote server for activity/event recognition purposes, because the image capturing device or remote server would be performing activity/event recognition even when no objects are present, thereby wasting processing resources and resulting in a slower system. Furthermore, in instances where the wireless network charges a customer based on an amount of data sent through the network, it may be extremely costly for the image capturing device to indiscriminately and continuously send captured images to the remote server. Therefore, an image capturing device can be configured to selectively perform activity/event recognition or send images over the wireless network for activity/event recognition purposes.

In some embodiments, activity/event recognition can be performed, or captured images can be sent over the wireless network, when the image capturing device determines an occurrence of a triggering event for activity/event recognition, which will be referred to herein as a "activity/event recognition triggering event". An activity/event recognition triggering event can be a situation observed by an image capturing device that has a high likelihood of there being an activity occurring. For instance, an activity/event recognition triggering event can be an instance where an excavator and a dump truck are close to one another, which has a high likelihood of there being an activity of scooping and pouring into the dump truck by the excavator.

The activity/event recognition triggering event can be defined by one or more factors that are associated with a high likelihood of an activity occurring, such as whether the type of heavy equipment present is one of a set of predefined objects, and whether a combination of the types of heavy equipment present is one of a set of predefined combinations of objects. For instance, a dump truck can be listed in the set of predefined objects because a dump truck can dump material at an earthmoving site, which may be an important activity for tracking productivity. So, if the image capturing device identifies that a dump truck is present, activity/event recognition can be performed by the image capturing device, or captured images can be sent to the remote server for activity/event recognition processing, until dump truck is not present anymore. In another example, the combination of an excavator and a loader can be listed in the set of predefined combinations of objects because an excavator can load a dump truck at the earthmoving site, which may also be an important activity for tracking productivity. So, if the image capturing device identifies that an excavator and a dump truck are present, activity/event recognition can be performed by the image capturing device, or captured images can be sent to the remote server for activity/event recognition processing, until that combination is not present anymore.

In some embodiments, a distance between heavy equipment can also be considered while identifying an activity/event recognition triggering event. For instance, if an excavator and a dump truck are present in the captured images but the distance between their calculated 3D position in the earthmoving site is greater than a distance threshold, an activity/event recognition triggering event may not be identified. Alternatively, if an excavator and a dump truck are present in the captured images and the distance between their calculated 3D position in the earthmoving site is less than the distance threshold, an activity/event recognition triggering event may be identified. This is because a notable activity, such as loading a dump truck, is likely to occur when the two objects are close to one another at the earthmoving site. Once the triggering event is identified, then the image capturing device can perform activity/event recognition, or captured images may begin to be sent over the wireless network for activity/event recognition purposes.

E. Safety Awareness

Although embodiments include image capturing systems that can perform image classification to identify types of heavy equipment, and can perform object detection and photogrammetry to identify the 3D position of the heavy equipment and surface contours at the earthmoving site, embodiments are not so limited. In some embodiments, an image capturing system can also be configured to identify personnel and their 3D position within the earthmoving site. Being able to identify personnel and their 3D position allows the image capturing system to maintain personnel safety by emitting safety alerts, such as an audio and/or visual alarm, when a dangerous situation is identified, e.g., when a person is too close to a heavy equipment in operation.

As an example, an image capturing system can perform image classification to identify that a person is present at the earthmoving site amongst one or more heavy equipment, and can further perform object detection and photogrammetry to identify the 3D position of the person. The image capturing system can also determine that a heavy equipment is present at the earthmoving site, and that the heavy equipment is in operation based on whether the boundary around the heavy equipment is changing, indicating the that heavy equipment is moving and thus in operation. If it is determined that a person is within a safety distance threshold to a heavy equipment in operation, an alarm can be emitted at the earthmoving site to notify the person.

In some embodiments, safety awareness can be performed locally by an image capturing device at the earthmoving site. That way, captured images do not need to be sent over a network to a remote server and can instead be analyzed locally to provide a fast response time for alerting personnel at the earthmoving site.

III. Architecture of the Image Capturing System

Figure 6:
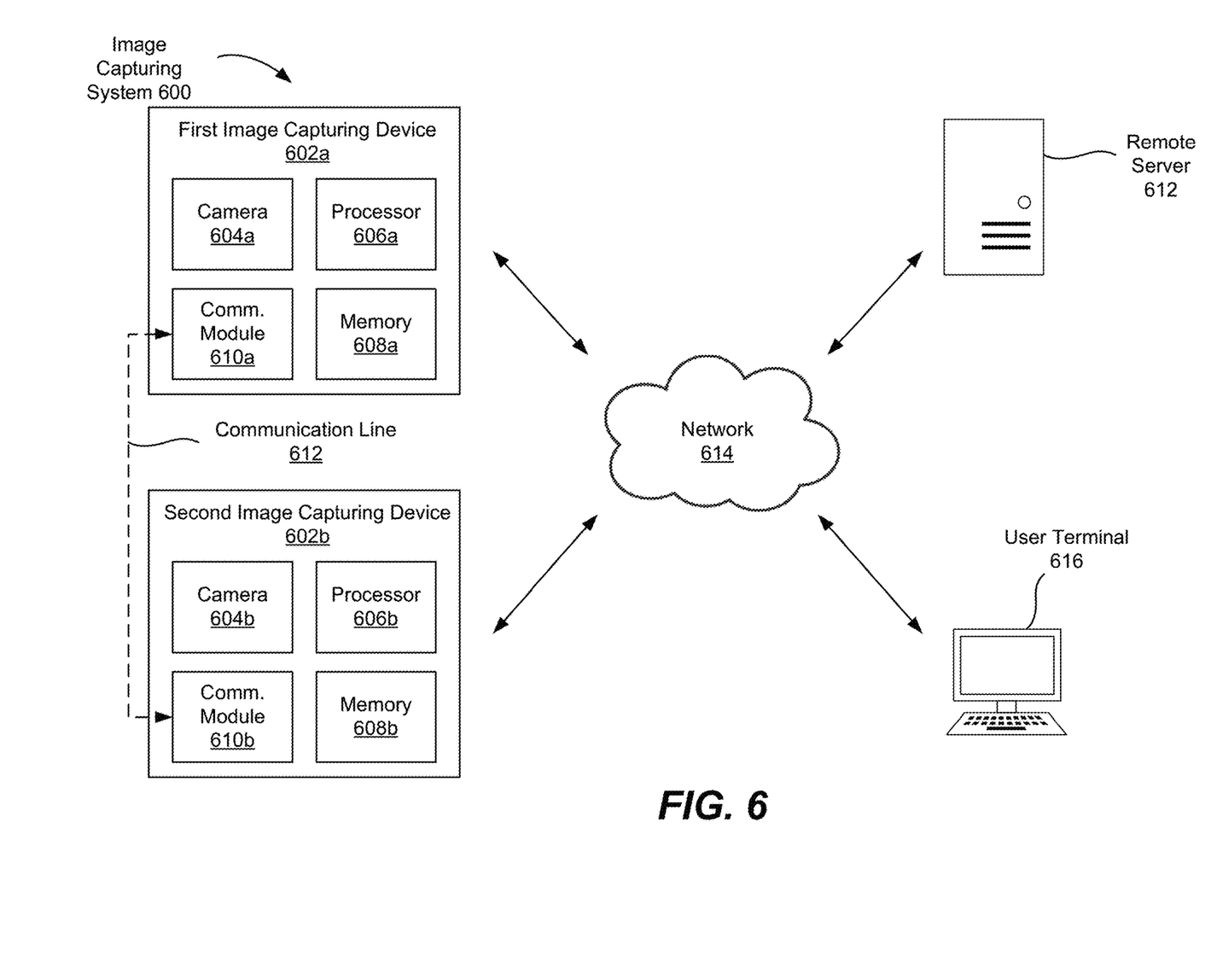
FIG. 6 is a simplified illustration of an example architecture of an image capturing system, according to some embodiments of the present disclosure.

FIG. 6 is a simplified illustration of an example architecture of an image capturing system 600, according to some embodiments of the present disclosure. Image capturing system 600 can include one or more image capturing devices 602, such as a first image capturing device 602*a* and a second image capturing device 602*b*, that are positioned at different locations at an earthmoving site. Each of the first and second image capturing devices can include a camera 604*a-b*, processor 606*a-b*, and memory 608*a-b*. Both camera 604*a-b* and memory 608*a-b* can be coupled to processor 606*a-b* so that processor 606*a-b* can control the operation of image capturing devices 602*a-b*.

Camera 604*a-b* can be any suitable image capturing device for capturing images in red-green-blue (RGB) or monochrome format, such as a charge coupled device (CCD) camera. Processor 606*a-b* can be any suitable processor capable of executing instructions for controlling the operation of image capturing device 602*a-b*, such as a microcontroller, application specific integrated circuit (ASIC), computer processing unit (CPU), field programmable logic array (FPGA), graphics processing unit (GPU), and the like. Memory 608*a-b* can include volatile and non-volatile memory for supporting the operation of processor 606*a-b*, such as dynamic random-access memory (DRAM), read-only memory (ROM), a hard disk drive, and the like. Memory 608*a-b* can include instructions that, when executed, instruct processor 606*a-b* to perform the functions discussed herein, e.g., image capturing, image classification, object detection, 3D positioning, surface creation, and safety awareness.

In some embodiments, each image capturing device 602*a-b* can also include a communication module 610*a-b* coupled to processor 606*b*. Communication module 610*a-b* can be any suitable device capable of transmitting and receiving data from an external device. For instance, communication module 610*a-b* can be a wired communication module, such as a power-over-Ethernet (PoE) module or a wireless communication module, such as a wireless fidelity module (WiFi) module, Bluetooth module, and the like. In certain embodiments, first image capturing device 602*a* can be communicatively coupled to second image capturing device 602*b* over a wired or wireless communication line 612. That way, data can be transferred between first and second image capturing devices 602*a-b*, such as positional data for performing photogrammetry, as discussed herein with respect to FIGS. 4 and 5.

Figure 7:
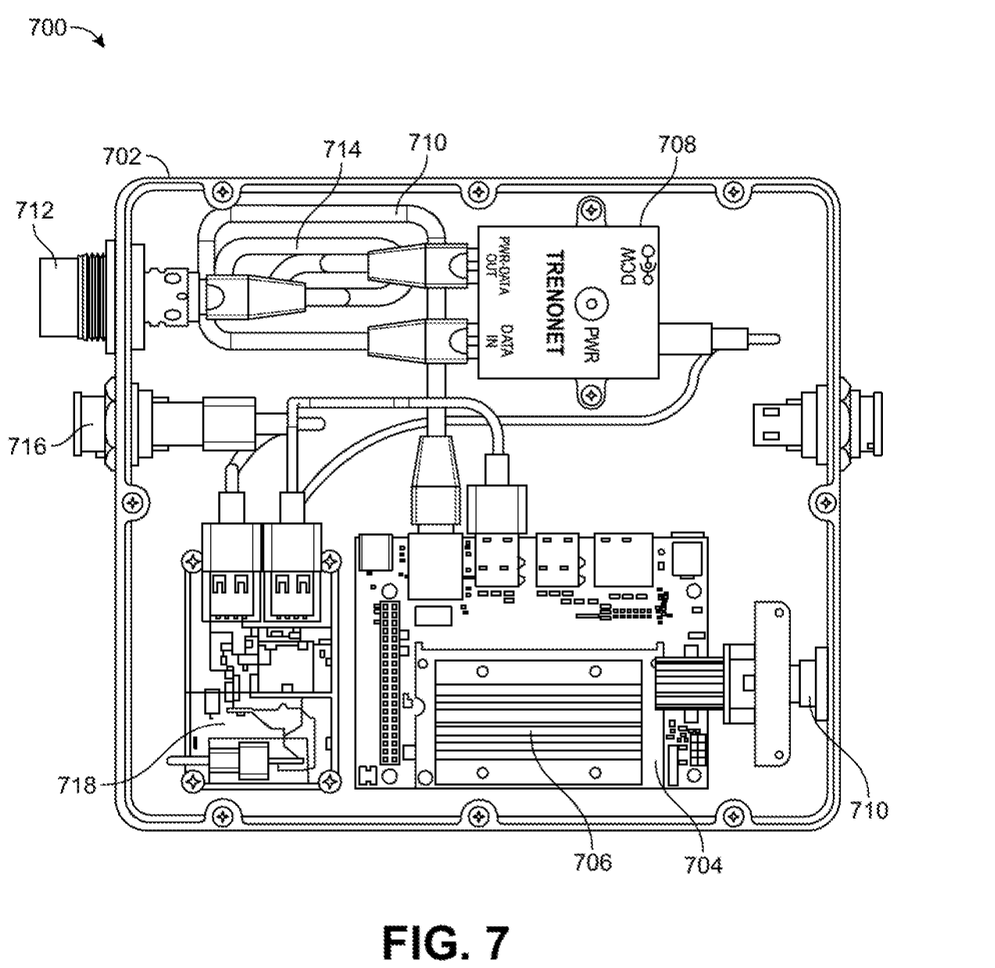
FIG. 7 is a top-down view of an example image capturing device, according to some embodiments of the present disclosure.

Image capturing device 602*a-b* can be a standalone unit that is positioned at an earthmoving site, as better shown in FIG. 7. FIG. 7 is a top-down view of an example image capturing device 700, according to some embodiments of the present disclosure. Image capturing device 700 can include a housing 702 that defines an inner cavity within which a processor 704, memory (not shown), camera 712, and a cooling component 706 mounted on processor 704 can be positioned. Image capturing device 700 can also include a communication module 708 coupled to processor 704 via a power and communication cable 710, e.g., twisted pair Ethernet cabling. Communication module 708 can be a PoE module that can pass direct current (DC) power along with data over Ethernet cabling to send power to processor 704 while also being able to send/receive data to/from processor 704. Communication module 708 can also send/receive data to/from an external device by way of an external communication port 712 via a communication cable 714 (e.g., Ethernet cabling). In some embodiments, image capturing device 700 can also include a power port 716 for receiving external power, and a power converter 718 for converting the received power to a higher or lower voltage level. The converted power can then be received by communication module 708 and relayed to processor 704 via power and communication cable 710. Data from processor 704, such as digital data representing captured images, can be sent to an external device by way of power and communication line 710, communication module 708, communication cable 714, and finally external communication port 712. The external device can be a remote server, a communication device that sends the digital data to a remote server over a wired or wireless network, or another image capturing device, such as a primary device for performing photogrammetry as discussed herein.

With reference back to FIG. 6, first and second image capturing devices 602a-b can be coupled to a remote server 612 over a communication network 614. In some embodiments, communication network 614 is a wired communication network or a wireless communication network, such as a cellular network (e.g., Global System for Mobile Communications (GSM) or Personal Communications service (PCS)), wireless local area networks (WLANs), and any other suitable wireless network. Remote server 612 can be computer program or device located away from the earthmoving site that is dedicated to performing computations. In some embodiments, remote server 612 can be configured to receive captured images from devices 602a-b to perform object detection, 3D positioning, surface creation, activity recognition, and/or event recognition, as discussed herein. Remote server 612 can also provide a database within which data from devices 602a-b and data generated by remote server 612 can be stored for later processing.

In some embodiments, image capturing system 600 can further include a user terminal 616 coupled to remote server 612 and image capturing devices 602a-b over wireless network 614. User terminal 616 can access remote server 612 and image capturing devices 602a-b to access data to display to a user or perform further calculations. For instance, images captured at the earthmoving site by devices 602a-b can be replayed to the user, and/or processed data stored in remote server 612 (e.g., type of heavy equipment identified, surface profile movement, 3D position of heavy equipment, and the like) can be displayed to the user or analyzed for surface creation. User terminal 616 can be any suitable user interface, such as a desktop computer, smart phone, laptop, tablet, and the like.

IV. Operational Configuration of the Image Capturing System

Figure 8:
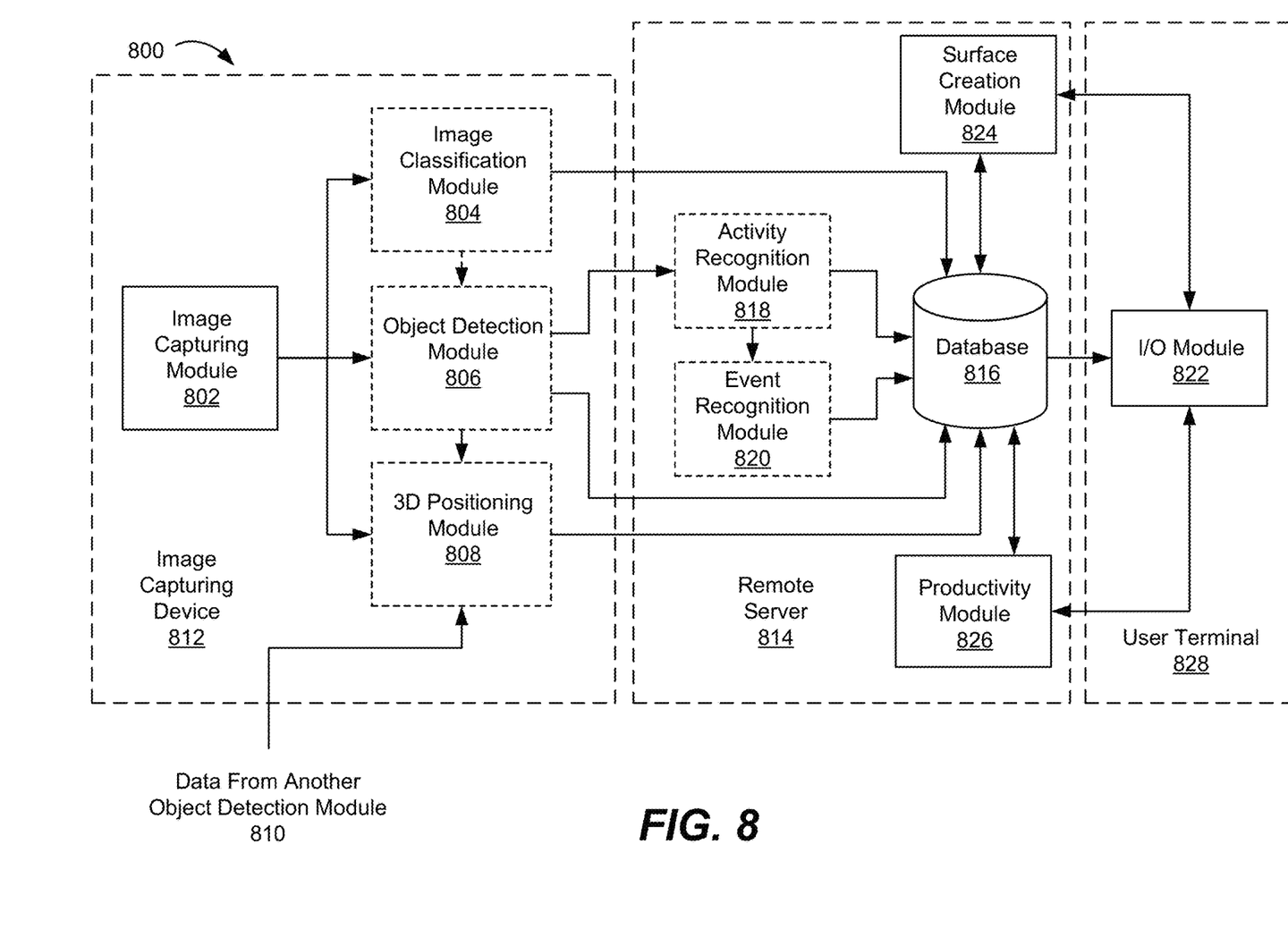
FIG. 8 is a simplified illustration of an example operational configuration of an image capturing system, according to some embodiments of the present disclosure.

FIG. 8 is a simplified illustration of an example operational configuration of an image capturing system 800, according to some embodiments of the present disclosure. FIG. 8 illustrates various functional modules and how each of them interact with one another to perform the various functions discussed herein for productivity capture. The functional modules can be implemented in hardware, software, or a combination of both hardware and software, including one or more signal processing and/or application specific integrated circuits.

As shown in FIG. 8, an image capturing module 802 that can generate/receive digital data from an image sensor, e.g., a CCD sensor, that is exposed to a scene at an earthmoving site. The digital data can represent a captured image at the earthmoving site, and can be inputted into an image classification module 804, object detection module 806, and a 3D positioning module 808. Image classification module 804 can perform image classification on the digital data received from image capturing module 802 to identify types of heavy equipment and/or personnel, as discussed herein with respect to FIG. 2. Object detection module 806 can perform object detection on the digital data received from image capturing module 802 to identify a pixel location of an object in the captured image, and to generate or define a boundary around the object in the captured image, as discussed herein with respect to FIG. 3. 3D positioning module 808 can perform photogrammetry on the digital data received from image capturing module 802 to identify a 3D position of an object at the earthmoving site, as discussed herein with respect to FIGS. 4 and 5. Accordingly, 3D positioning module 808 can also be configured to receive data 810 from another object detection module, such as positioning data determined from images captured from a different perspective than the images processed by image capturing module 802. That way, 3D positioning module 808 can perform photogrammetry using captured images from multiple different perspectives.

In some embodiments, image capturing module 802, image classification module 804, object detection module 806, and 3D positioning module 808 are implemented by an image capturing device 812 positioned locally at the earthmoving site. Object detection module 806 and/or 3D positioning module 808 can be optionally implemented in a remote server 814 instead of in image capturing device 812. This optionality is represented by the short dashed lines shown in FIG. 8. Configuring image capturing device 812 with fewer functional modules reduces the functionality of image capturing device 812 as well as its cost, thereby allowing image capturing device 812 to be configurable depending on customer needs. In some embodiments, if image capturing device 812 includes object detection module 806, device 812 may not be implemented with image classification module 804. Doing so would be redundant given that object detection module 806 can identify a classification, e.g., type, of the object, e.g., heavy equipment. If image classification module 804 is implemented in image capturing device 812 but object detection module 806 is implemented in remote server 814, then image classification module 804 can also be configured to send images to object detection module 806 for performing object detection.

Data outputted by image classification module 804, object detection module 806, and 3D positioning module 808 can be sent to database 816 for storage, as well as to an activity recognition module 818 for performing activity recognition as discussed herein in Section II(D). Output of activity recognition module 818 can be received by an event recognition module 820 for performing event recognition as also discussed herein in Section II(D). Output of activity recognition module 818 and event recognition module 820 can also be stored in database 816. In some embodiments, activity recognition module 818, event recognition module 820, and database 816 are implemented in remote server 814. Optionally, as indicated by the short dashed lines in FIG. 8, activity recognition module 818 and/or event recognition module 820 can be implemented in image capturing device 812 when device 812 is configured with a high-performance processor.

Image classification module 804 can output JSON data (or any other data in a lightweight format) representing the type of heavy equipment identified at the earthmoving site. Object detection module 806 can also output JSON data (or any other data in a lightweight format) for 3D position of the object within the field of view, and can selectively relay digital data representing the captured images from image capturing module 802 to activity recognition module 818 in response to a triggering event to reduce an amount of data transferred over the wireless network, as discussed herein in Sections II(C) and II(D). 3D positioning module 808 can output JSON data (or any other data in a lightweight format) representing the 3D position of the heavy equipment as well as the boundary dimensions around the heavy equipment. As can be appreciated herein, a majority of data sent from image capturing device 812 to remote server 814 over the wireless network has a small file size (e.g., JSON data/text data), while only a small majority of that data is in a large file size (e.g., digital data representing captured images). Thus, the amount of data transmitted over the network can be small, thereby resulting in a more efficient and faster image capturing system, while also resulting in lower data transmission cost.

In some embodiments, image capturing system 800 can also include an input/output (I/O) module 822, a surface creation module 824, and a productivity module 826 implemented in a user terminal 828. I/O module 822 can be any suitable user interface for outputting information to a user and for receiving input from the user. For instance, I/O module 822 can include a display, touchscreen display, keyboard, mouse, trackpad, and the like. I/O module 822 can display any of the data stored in database 816 and outputted by surface creation module 822 and productivity module 826, and can receive input from a user to modify what and how the information is displayed.

Surface creation module 824 can perform photogrammetry on images captured from two or more image capturing devices at the earthmoving site to provide surface contouring, as discussed herein in Section II(C). The images can be fetched from database 816, and the digital data from captured images that represent the surfaces of the earthmoving site, as opposed to the heavy equipment, can be analyzed to identify the surface contour of the earthmoving site. The created surface can be stored back into database 816 for later processing, or it can be outputted by I/O module 822 to a user. In some embodiments, inputs from a user via I/O module 816 can dictate which captured images from database 816 should be analyzed by surface creation module 826. A user may be particularly interested in surface contours at a certain time or between a certain time window, and may thus input commands to surface creation module 824 to create the surface of the earthmoving site accordingly.

Productivity module 826 can access data stored in database 816 for determining the productivity of the heavy equipment at the earthmoving site. Productivity module 826 may use data outputted by any of modules 804, 806, 808, 818, 820, and 824 to determine a productivity of the earthmoving site. For instance productivity module 826 can determine that an excavator has scooped and poured dirt into a dump truck 40 times (based on data from image classification module 804, activity recognition module 818, and event recognition module 820), which resulted in 5 full dump truck loads that drove away (based on data from object detection module 806 and/or 3D positioning module 808) and a total of approximately 1000 cubic feet of ground removal (based on data from surface creation module 824). In another instance, productivity module 826 can determine that a bulldozer has flattened 80 percent of the earthmoving site after making 10 staggered passes (based on data from 3D positioning module 808). This productivity data can be sent to I/O module 822 for outputting to a user, or it can be stored in database 816 for record keeping and later retrieval. As can be appreciated herein, the plethora of data generated by the different modules in the image capturing system can be used in various ways to improve a monitoring system's efficiency, speed, and accuracy with tracking productivity of heavy equipment at an earthmoving site.

It is to be appreciated that while FIG. 8 discusses what modules are implemented in which devices, embodiments are not so strictly limited. One skilled in the art can mix and match modules with devices in any embodiment, while still achieving the functionality discussed herein.

V. Method of Operating the Image Capturing System

Figure 9:
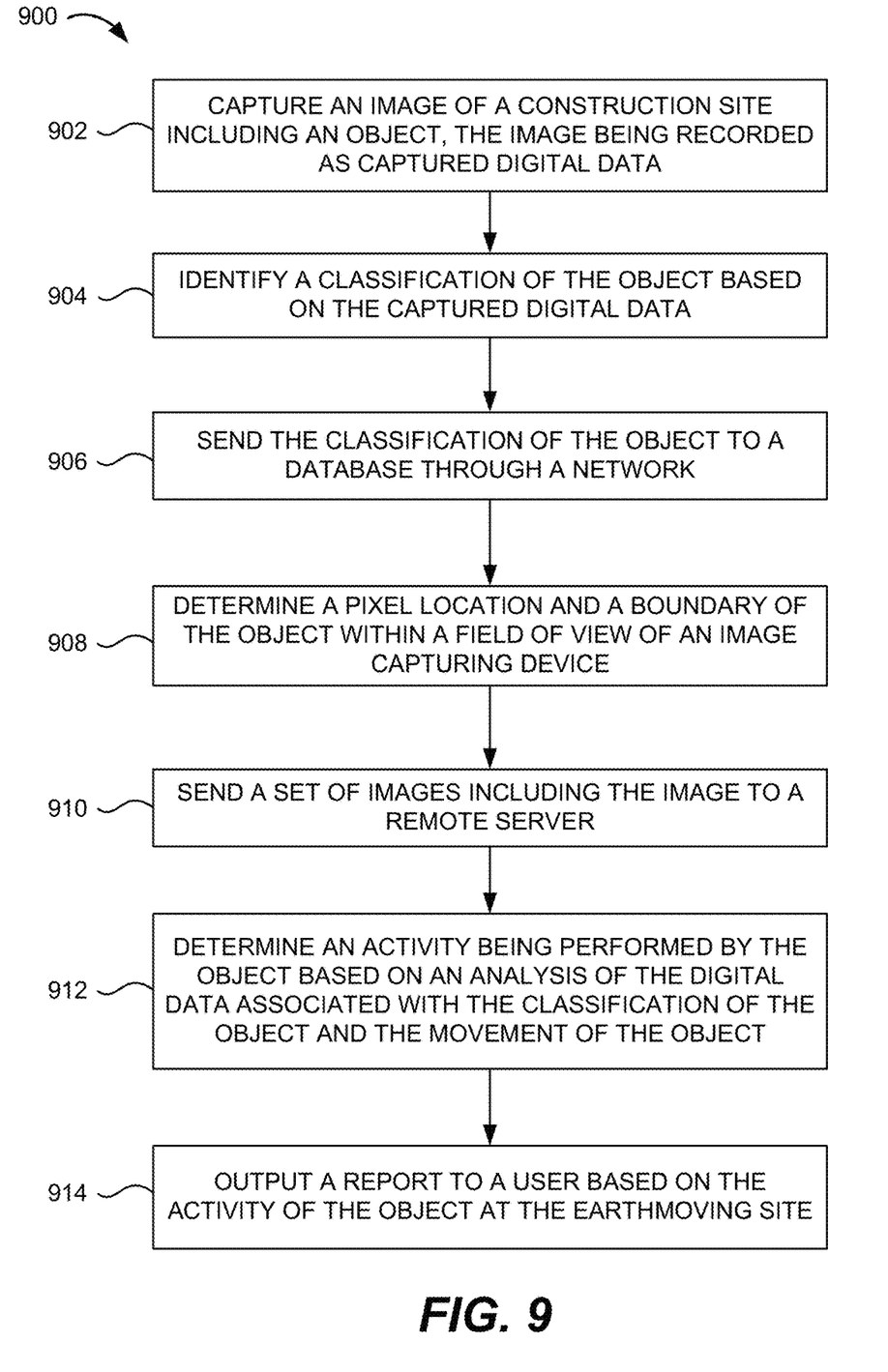
FIG. 9 is a simplified illustration of a method 900 of operating an image capturing system, according to some embodiments of the present disclosure.

FIG. 9 is a simplified illustration of a method 900 of operating an image capturing system, according to some embodiments of the present disclosure. At block 902, an image of an earthmoving site is captured by an image capturing device. The image can be included in a set of captured images and can include an object at the earthmoving site. The image can be recorded as digital data by a processor in the image capturing device. An example captured image is shown in primary section 202 of FIG. 2 herein.

At block 904, a classification of the object based on the captured digital data can be identified. For instance, image classification can be performed on the captured image to identify what type of heavy equipment the object is, as discussed herein with respect to FIG. 2. Then, at block 906, the classification of the object can be sent to a remote server for storage and/or processing, such as storing into a database e.g., database 816 in remote server 814 discussed herein with respect to FIG. 8.

At block 908, a pixel location and a boundary of the object can be determined within a field of view of the image capturing device. For example, the image capturing device can perform object detection to identify a pixel location of the object within its field of view, and a boundary around the object, such as a boundary box or boundary line, as discussed herein with respect to FIG. 3. At block 910, a set of images including the captured image can be sent to the remote server. For instance, the image capturing device can selectively send captured images when the calculated 3D positions of two objects are within a threshold distance to one another, or when a certain type of heavy equipment is captured by the image capturing device, as discussed herein with respect to photogrammetry and activity recognition in Sections II(C) and 11(D) herein.

At block 912, an activity being performed by the object can be determined based on an analysis of the digital data associated with the classification of the object and the movement of the object. For instance, the image capturing device or the remote server can access data stored in the database to perform activity recognition and/or event recognition as discussed herein in Section II(D). Then, at block 914, a report can be outputted to a user based on the activity performed by the object at the earthmoving site. The report can be a productivity report that informs the user about what has been performed at the earthmoving site and how much material has been moved. The report can be a graphical output, as shown in FIGS. 2, 3, and 5, a textual output, such as JSON data in numbers and words indicating productivity of the object as discussed herein with respect to FIGS. 2, 3, and 8, or a combination of both graphical and textual outputs.

Although the invention has been described with respect to specific embodiments, it will be appreciated that the invention is intended to cover all modifications and equivalents within the scope of the following claims.

What is claimed is:

1. A method for capturing objects in action at an earthmoving site, the method comprising:
    capturing, by an image capturing device positioned at the earthmoving site, an image of a region of the earthmoving site including an object, the image being recorded as captured digital data;
    identifying a classification of the object using a trained algorithm existing in memory of the image capturing device;
    sending, by the image capturing device, and in response to identifying the classification of the object, the classification of the object to a remote server through a network;
    determining a pixel location and a boundary of the object within a field of view of the image capturing device based on positions of pixels of the object in the image;
    identifying, by the image capturing device, a triggering event in the image based on the classification of the object, the pixel location, and the boundary of the object;
    sending, by the image capturing device, and in response to identifying the triggering event, a set of images including the image as digital data to the remote server, the set of images representing movement of the object at the earthmoving site;
    determining, in response to identifying the triggering event, an activity being performed by the object based on an analysis of the digital data associated with the set of images, the classification of the object, and the movement of the object at the earthmoving site; and
    outputting a report to a user based on the activity performed by the object at the earthmoving site.

2. The method of claim 1, wherein the object is a first object, the pixel location is a first pixel location, the boundary is a first boundary, the image capturing device is a first image capturing device, and the image includes the first object and a second object.

3. The method of claim 2, further comprising:
    determining a second pixel location and a second boundary of the second object within the field of view of the image capturing device based on positions of pixels of the second object in the image;
    determining a first three-dimensional (3D) position of the first object in the earthmoving site based on the first pixel location in the field of view of the first image capturing device and a third pixel location in a field of view of a second image capturing device;
    determining a second 3D position of the second object in the earthmoving site based on the second pixel location in the field of view of the first image capturing device and a fourth pixel location in the field of view of the second image capturing device;
    determining a distance between the first 3D position and the second 3D position;
    comparing the distance to a proximity threshold indicating a minimum distance between the first and second objects; and
    in response to a determination that the distance is below the proximity threshold, identifying the triggering event in the image further based on the determination that the distance is below the proximity threshold.

4. The method of claim 3, wherein the image includes the first object and the second object when the distance between the first 3D position and the second 3D position are below the proximity threshold.

5. The method of claim 3, further comprising:
    generating, by the image capturing device, a warning signal in response to the determination that the distance is below the proximity threshold.

6. The method of claim 1, further comprising:
    determining that the classification of the object is one of a set of predefined objects; and
    in response to the determination that the classification of the object is the one of the set of predefined objects, performing the sending of the set of images to the remote server.

7. The method of claim 1, wherein the image capturing device is a first image capturing device positioned at a first physical location within the earthmoving site, the image is a first image, the region is a first region of the earthmoving site, the captured digital data is a first captured digital data, and wherein the method further includes:
    capturing, by a second image capturing device positioned at a second physical location within the earthmoving site different from the first physical location, a second image of a second region of the earthmoving site including the object from a different perspective than the first image capturing device, the second image being recorded as second captured digital data; and
    using a first known position of the first image capturing device and second known position of the second image capturing device, along with a known 3D position of a common point captured within fields of view of the first and second image capturing devices, to determine a position of the object at the earthmoving site in 3D space.

8. The method of claim 1, wherein determining the pixel location and the boundary of the object is performed by the image capturing device at the earthmoving site.

9. The method of claim 8, further comprising sending, by the image capturing device, the pixel location and the boundary of the object to the remote server through the network.

10. The method of claim 1, wherein the boundary is a boundary box that forms a rectangle around the object and that dynamically moves in location and dimension corresponding to a movement of the object through the set of images.

11. The method of claim 1, wherein the object is at least one of a group consisting of heavy equipment and personnel.

12. An image capturing device for capturing objects in action at an earthmoving site, the image capturing device comprising:
    a camera for capturing images of a region of the earthmoving site;
    communication circuitry operable to send data to a remote server;
    memory for storing at least a portion of the captured images of the region of the earthmoving site, the memory comprising an image classifier module or an object detection module; and a processor coupled to the memory, the camera, and the communication circuitry, the processor capable of executing instructions in the memory to:
  capture an image of the region of the earthmoving site including an object, the image being recorded as captured digital data;
  identify a classification of the object using a trained algorithm of the image classifier module or the object detection module existing in the memory;
  send, in response to identifying the classification of the object, the classification of the object to the remote server through a network;
  determine, by the object detection module, a pixel location and a boundary of the object within a field of view of the image capturing device based on positions of pixels of the object in the image;
  identify a triggering event in the image based on the classification of the object, the pixel location, and the boundary of the object
  send, in response to identifying the triggering event, a set of images including the image as digital data to the remote server, the set of images representing a movement of the object at the earthmoving site;
  determine, in response to identifying the triggering event, an activity being performed by the object based on an analysis of the digital data associated with the set of images, the classification of the object, and the movement of the object at the earthmoving site; and
  output a report to a user based on the activity performed by the object at the earthmoving site.

13. The image capturing device of claim 12, wherein the object is a first object, the pixel location is a first pixel location, the boundary is a first boundary, the image capturing device is a first image capturing device, and the image includes the first object and a second object.

14. The image capturing device of claim 13, wherein the processor is further configured to:
  determine a second pixel location and a second boundary of the second object within the field of view of the image capturing device based on positions of pixels of the second object in the image;
  determine a first three-dimensional (3D) position of the first object in the earthmoving site based on the first pixel location in the field of view of the first image capturing device and a third pixel location in a field of view of a second image capturing device;
  determine a second 3D position of the second object in the earthmoving site based on the second pixel location in the field of view of the first image capturing device and a fourth pixel location in the field of view of the second image capturing device;
  determine a distance between the first 3D position and the second 3D position;
  compare the distance to a proximity threshold indicating a minimum distance between the first and second objects; and
  in response to a determination that the distance is below the proximity threshold, identify the triggering event in the image further based on the determination that the distance is below the proximity threshold.

15. The image capturing device of claim 14, wherein the image includes the first object and the second object when the distance between the first 3D position and the second 3D position are below the proximity threshold.

16. The image capturing device of claim 14, wherein the processor is further configured to:
  generate a warning signal in response to the determination that the distance is below the proximity threshold.

17. A system for capturing an object in action at an earthmoving site, the system comprising:
  a first image capturing device positioned within the earthmoving site and operable to capture first images of a first region of the earthmoving site; and
  a second image capturing device positioned within the earthmoving site and configured to capture second images of a second region of the earthmoving site, wherein the first region overlaps with at least a portion of the second region, and wherein the first image capturing device and the second image capturing device are communicatively coupled to a remote server over a network,
  wherein the first image capturing device comprises:
    a camera for capturing the first images of the first region;
    communication circuitry operable to send data to the remote server;
    memory for storing at least a portion of the captured first images of the first region of the earthmoving site, the memory comprising an image classifier module and an object detection module; and
    a processor coupled to the memory, the camera, and the communication circuitry, the processor capable of executing instructions in the memory to:
      capture an image of a region of the earthmoving site including an object, the image being recorded as captured digital data;
      identify a classification of the object using a trained algorithm existing in the memory of the first image capturing device;
      send, in response to identifying the classification of the object, the classification of the object to the remote server through the network;
      determine a pixel location and a boundary of the object within a field of view of the first image capturing device based on positions of pixels of the object in the image;
      identify a triggering event in the image based on the classification of the object, the pixel location, and the boundary of the object
      send, in response to identifying the triggering event, a set of images including the image as digital data to the remote server, the set of images representing a movement of the object at the earthmoving site; and
      determine, in response to identifying the triggering event, an activity being performed by the object based on an analysis of the digital data associated with the set of images, the classification of the object, and the movement of the object at the earthmoving site,
    wherein a report based on the activity performed by the object at the earthmoving site is outputted to a user.

18. The system of claim 17, wherein the first image capturing device is communicatively coupled to the second image capturing device so that data can be transferred between the first and second image capturing devices.

19. The system of claim 17, wherein the object is a first object, the pixel location is a first pixel location, the boundary is a first boundary, and the image includes the first object and a second object.

20. The system of claim 19, wherein the processor is further configured to:
- determine a second pixel location and a second boundary of the second object within the field of view of the first image capturing device based on positions of pixels of the second object in the image;
- determine a first three-dimensional (3D) position of the first object in the earthmoving site based on the first pixel location in the field of view of the first image capturing device and a third pixel location in a field of view of the second image capturing device;
- determine a second 3D position of the second object in the earthmoving site based on the second pixel location in the field of view of the first image capturing device and a fourth pixel location in the field of view of the second image capturing device;
- determine a distance between the first 3D position and the second 3D position;
- compare the distance to a proximity threshold indicating a minimum distance between the first and second objects; and
- in response to a determination that the distance is below the proximity threshold, identify the triggering event in the image further based on the determination that the distance is below the proximity threshold.

* * * * *